(12) United States Patent
Tajima (10) Patent No.: US 12,218,579 B2
(45) Date of Patent: Feb. 4, 2025

(54) SEMICONDUCTOR DEVICE

(71) Applicant: Renesas Electronics Corporation, Tokyo (JP)

(72) Inventor: Hideyuki Tajima, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 221 days.

(21) Appl. No.: 18/145,328

(22) Filed: Dec. 22, 2022

(65) Prior Publication Data

US 2023/0198378 A1      Jun. 22, 2023

(30) Foreign Application Priority Data

Dec. 22, 2021 (JP) .................................. 2021-207824

(51) Int. Cl.
 *G05F 3/26* (2006.01)
 *H02M 1/00* (2007.01)
 (Continued)

(52) U.S. Cl.
 CPC ............. *H02M 1/32* (2013.01); *G05F 3/262* (2013.01); *H02M 1/0009* (2021.05); *H02M 1/08* (2013.01); *H02M 3/158* (2013.01); *H02M 1/0006* (2021.05)

(58) Field of Classification Search
 CPC ............. H02M 1/0006; H02M 1/0009; H02M 1/0029; H02M 1/08; H02M 1/088; H02M 1/32; H02M 1/34; H02M 1/38; H02M 3/156; H02M 3/1563; H02M 3/157; H02M 3/158; G05F 1/46; G05F 1/56; G05F 1/561; G05F 1/575; G05F 3/08; G05F 3/16; G05F 3/24; G05F 3/26; G05F 3/262;
(Continued)

(56) References Cited

U.S. PATENT DOCUMENTS

2013/0027117 A1* 1/2013 Dorfan ....................... G05F 3/26
                                                                   327/513
2016/0342172 A1* 11/2016 Bai ........................... G05F 3/267
(Continued)

FOREIGN PATENT DOCUMENTS

| CN | 114095013 A | * | 2/2022 |
| JP | 2003140756 A | * | 5/2003 |
| JP | 2020005422 A |   | 1/2020 |

*Primary Examiner* — Thienvu V Tran
*Assistant Examiner* — Shahzeb K Ahmad
(74) *Attorney, Agent, or Firm* — SCULLY, SCOTT, MURPHY & PRESSER, P.C.

(57) ABSTRACT

A semiconductor device includes: a constant current generating circuit unit; a first current mirror circuit unit having a constant current as an input current and generating a first mirror current as a mirror current; a level shift circuit unit including a clamp transistor between whose drain and source a first mirror current flows and to whose base a power supply voltage of the constant current generating circuit unit is applied, and a transistor that is connected in series to the clamp transistor and through which the first mirror current flows; a second current mirror circuit unit having as an input stage a transistor and having as an output stage a transistor through which a second mirror current replicating the first mirror current flows; and an error absorption circuit unit connected to a terminal for outputting the second mirror current of the output-stage transistor in the second current mirror circuit unit.

7 Claims, 9 Drawing Sheets

(51) Int. Cl.
*H02M 1/08* (2006.01)
*H02M 1/32* (2007.01)
*H02M 3/158* (2006.01)

(58) Field of Classification Search
CPC ....... G05F 3/265; G05F 3/267; H03K 17/687; H03K 17/02; H03K 17/66
See application file for complete search history.

(56) References Cited

U.S. PATENT DOCUMENTS

| | | | |
|---|---|---|---|
| 2020/0162074 A1* | 5/2020 | Niikura | H03K 17/04123 |
| 2021/0382510 A1* | 12/2021 | Takobe | G05F 1/575 |
| 2022/0231611 A1* | 7/2022 | Blanco | H02M 1/0041 |

* cited by examiner

SEMICONDUCTOR DEVICE

CROSS-REFERENCE TO RELATED APPLICATION

The present application claims priority from Japanese Patent Application No. 2021-207824 filed on Dec. 22, 2021, the content of which is hereby incorporated by reference into this application.

BACKGROUND

The present invention relates to a semiconductor device, for example, an effective technique applicable to a semiconductor device on a high-voltage side in a mild hybrid system.

A power converter such as an inverter for a mild hybrid system uses a gate driver on a high-voltage side. The gate driver includes a protection circuit that detects a short circuit/excess current in a power semiconductor device such as an IGBT (Insulated Gate Bipolar Transistor) and protects the power semiconductor device when a short-circuit fault occurs.

There are disclosed techniques as below.

[Patent Document 1] Japanese Unexamined Patent Application Publication No. 2020-5422

SUMMARY

For example, Patent Document 1 (Japanese Patent Application Laid-open No. 2020-5422) discloses, on a high-voltage side, an IGBT that is a power semiconductor device for driving a motor, and a gate driver that drives the IGBT. Also, normally, a current detection circuit for detecting a current flowing through a motor is provided on the high-voltage side. Further, in order to keep a voltage, which is applied to the current detection circuit, as a power source as low as possible and also to keep a voltage between an input signal and a ground voltage as low as possible, conventionally, an output voltage of the IGBT has been used as the ground voltage for the current detection circuit.

In spite of a devisal of the circuits described above, on the high-voltage side, the IGBT that drives the motor, the gate driver that drives the IGBT, and the current detection circuit that detects the current flowing through the motor are individually required, which brings an increase in a mounting area. Further, on the high-voltage side, grounds having various potentials are mixed, so that a high withstand-voltage circuit is required and the high withstand-voltage circuit tends to make the mounting area large. In addition, if the IGBT is switched on, a high power-supply rejection ratio is required, which may require an additional circuit(s).

The present invention has been made in view of such circumstances. One of objects thereof is to provide a semiconductor device in which required circuit functions are combined and made one chip on the high-voltage side and a level shift behavior having a high power-supply rejection ratio from a low voltage to a high voltage by a level shift circuit and an error absorption circuit, etc. is possible. Other problems and novel features will become apparent from the description of the specification and the accompanying drawings.

The following is a brief description of an outline of the typical invention disclosed in the present application. A typical semiconductor device includes: a constant current generating circuit unit; a first current mirror circuit unit having as an input current a constant current outputted by the constant current generating circuit unit, and generating a first mirror current as a mirror current; a level shift current unit including a clamp transistor between whose drain and source the first mirror current flows and to whose base a power supply voltage of the constant current generating circuit unit is applied, and a transistor that is connected in series to the clamp transistor and through which the first mirror current flows; a second current mirror circuit unit having as an input stage the transistor and having as an output stage a transistor through which a second mirror current obtained by replicating the first mirror current flows; and an error absorption circuit unit having a capacitance corresponding to a parasitic capacitance of the clamp transistor connected to a terminal for outputting the second mirror current of the output-stage transistor in the second current mirror circuit unit.

According to one embodiment, provided can be a semiconductor device in which required circuit functions are combined and made one chip on the high-voltage side and a level shift behavior having a high power-supply rejection ration between a low voltage and a high voltage by a level shift circuit and an error absorption circuit, etc. is possible.

DETAILED DESCRIPTION

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Furthermore, the circuit elements constituting each functional block of the embodiments are not particularly limited, but are formed on a semiconductor substrate such as single crystal silicon by a well-known integrated circuit technique such as a CMOS (complementary MOS transistor).

Hereinafter, embodiments of the present invention will be described in detail with reference to the accompanying drawings. Note that components having the same function are denoted by the same reference characters throughout the drawings for describing the embodiments, and a repetitive description thereof will be omitted. Further, the dimension ratios of the drawings are exaggerated for the descriptions, and may often be different from actual ratios.

First Embodiment

Figure 1:
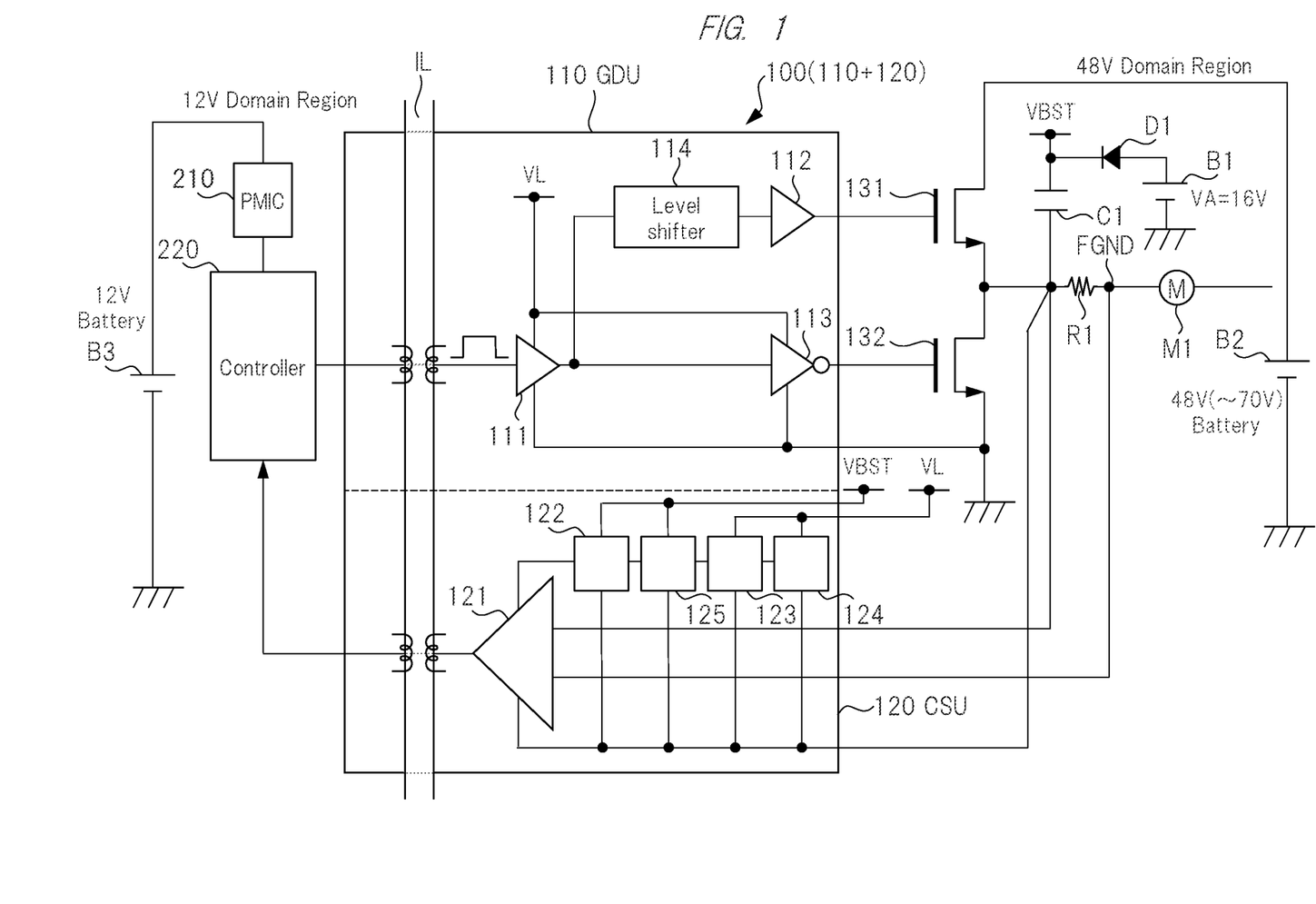
FIG. 1 is a block diagram for explaining an outline of a behavior of a system including one example of a semiconductor device according to a first embodiment.

FIG. 1 is a block diagram for explaining an outline of a behavior of a system including one example of a semiconductor device according to a first embodiment. A system in FIG. 1 shows an in-vehicle mild hybrid system as one example. A motor M1 in FIG. 1 is a three-phase motor that assists in moving a vehicle. FIG. 1 representatively shows one of the three phases. Through an insulating layer IL, a left side of FIG. 1 is a low-voltage region, which shows 12 volts (V) as one example of a low voltage. However, a battery B3 in the low-voltage region is not limited to 12 V. For example, a voltage of the battery B3 may be a voltage such as 16 V.

A 12-volt (V) domain region indicating the low-voltage region is a circuit region controlled by a low-voltage battery, for example, the 12-V battery B3. A power management integrated circuit (PMIC) 210 generates a power supply voltage necessary for circuits used in the 12-volt domain region. For example, the PMIC 210 in the 12-volt domain region can generate a voltage of 5 V as a power supply voltage for a controller 220.

Through the insulating layer IL, a right side of FIG. 1 is a high-voltage region, which shows a region controlled by a 48-volt (V) (maximum about 70 V) battery B2 as one example of a high voltage. The high-voltage region is a circuit region having a high-voltage battery, for example a 48-Volt (V) (maximum about 70 V) battery B2) in order to drive the motor M1 for auxiliary moving the vehicle.

The high-voltage region includes a gate driver unit (GDU) 110, a current detection unit (CSU) 120 that detects a current flowing through the motor M1, the motor M1, drive transistors 131, 132 that generate switching voltages for driving the motor M1, and the like. The GDU 110 and CSU 120 are integrated into one chip, include a level shift circuit unit 125 described later, and further adds an error absorption circuit, so that they configure a semiconductor device 100 in which a level shift behavior having a high power-supply rejection ratio from a low voltage to a high voltage is possible.

The GDU 110 generates drive pulses for alternately switching the drive transistors 131, 132 that drive the motor M1. The GDU 110 includes buffers 111, 112, an inverter 113, and a level shifter 114. A pulse signal outputted from the controller 220 is inputted to the inverter 113 and the level shifter 114 via the buffer 111. An output pulse of the inverter 113 is inputted to a gate of the drive transistor 132. When the output pulse is high, the drive transistor 132 is turned ON and a drain of the drive transistor 132 is electrically connected to the absolute ground. When the output pulse is low, the drive transistor 132 is turned off and the drain of the drive transistor 132 becomes a voltage of a source of the drive transistor 131.

The GDU 110 applies, as a power supply voltage VL, a voltage lower than the high voltage of the battery B2. For example, one example of the power supply voltage VL is 5 V, but a value of the power supply voltage VL is not limited to 5 V. It is possible to employ a power supply voltage of a general-purpose IC as the power supply voltage VL. It is also possible to set the power supply voltage VL to a voltage value between 3 V and 6 V.

The level shifter 114 is used to increase the voltage applied to the gate of the drive transistor 131 in order to switch the drive transistor 131 on. A value of the increased voltage can be determined by an output voltage of the battery B2, electrical characteristics of the drive transistor 131, and the like. An output signal of the level shifter 114 is inputted to the buffer 112, and an output pulse of the buffer 112 is inputted to a gate of the drive transistor 132. Since the output pulse of the buffer 112 and the output pulse of the inverter 113 are in an inverted relationship, ON/OFF states of the drive transistors 131, 132 also have a relationship that is inverted on the time axis. That is, when the drive transistor 131 is switched OFF, the drive transistor 132 is turned ON as described above and no current flows through the motor M1. Further, when the drive transistor 131 is switched ON, the drive transistor 132 is turned OFF and a current flows through the motor M1 via the battery B2. Such switching of the drive transistor 131 and the drive transistor 132 rotates the motor M1, and the vehicle or the like in which the motor M1 is mounted becomes movable.

The CSU 120 has a function of: detecting, as a voltage, the current flowing through the motor M1; and outputting the detected voltage to the controller 220. Since the current flowing through the motor M1 flows through a resistor R1, a detection voltage is generated across both ends of the resistor R1. The detection voltage is converted from an analog signal to a digital signal by an AD converter (not shown) via an amplifier 121, the converted digital signal is inputted to the controller 220, and the controller 220 monitors a driving state of the motor M1. The controller 220 outputs the above-mentioned pulse signal to the buffer 111 based on the driving state of the motor M1.

The CSU 120 includes a BGR (Band Gap Reference) circuit unit 124, an IREF circuit unit 123, an LDO (Low Drop Out) circuit unit 122, and a level shift circuit unit 125 in order to feed stable power supply to the amplifier 121. Since the amplifier 121 detects a voltage generated across the resistor R1, it may handle a voltage from a bootstrap voltage VBST to a floating ground FGND. Therefore, it is preferable that the bootstrap voltage VBST and the floating ground FGND are inputted also to the power supply voltage of the amplifier 121. Further, it is preferable to provide the LDO circuit unit 122 in order to reduce a voltage drop from the bootstrap voltage VBST. The LDO circuit unit 122 of the present embodiment will be described later. Furthermore, it is preferable to connect the LDO circuit unit 122 to the IREF circuit unit 123 that generates a constant current for generating a reference voltage for the LDO circuit unit 122. The IREF circuit section 123 of the present embodiment will also be described later. Moreover, it is preferable to provide the BGR circuit unit 124 for generating a constant voltage for generating a constant current generated in the IREF circuit unit 123. Since a BGR circuit is a well-known technique, a detailed description thereof will be omitted. In addition, it is preferable to provide the level shift circuit unit 125 for shifting a difference between power supply voltages applied to the IREF circuit unit 123 and the LDO circuit unit 122.

Since the BGR circuit unit 124, the IREF circuit unit 123, and the LDO circuit unit 122 are electrically connected to the amplifier 121, the bootstrap voltage VBST is supplied as a power supply voltage, which leads to a thought of not requiring unnecessary circuit portions. However, as described above, since the bootstrap voltage VBST is a high voltage, the BGR circuit unit 124 and the IREF circuit unit 123 to which the bootstrap voltage VBST is applied become high withstand-voltage circuits, which brings an increase in an area occupied in the semiconductor chip. Therefore, even if the current detection unit (CSU) 120 and the gate driver unit (GDU) 110 are integrated into one chip, this will have an opposite effect of reducing the overall area.

Thus, in the present embodiment, by applying a low voltage(s) to the power supply voltages of the BGR circuit unit 124 and the IREF circuit unit 123 by the level shift circuit unit 125, an area of one chip has been reduced in integrating the CSU 120 and the GDU 110 into one chip. In FIG. 1, given as one example of the low voltage is the power supply voltage VL of the buffer 111 and the inverter 113. Also, the power supply voltage VL includes a voltage of 3 to 6 V, but the power supply voltage VL is not limited to this voltage.

Further, the LDO circuit unit 122 is provided with the error absorption circuit unit described above, but the error absorption circuit unit is not shown in FIG. 1 and a detailed explanation thereof will be made in FIG. 3 or subsequently thereto.

Figure 2:
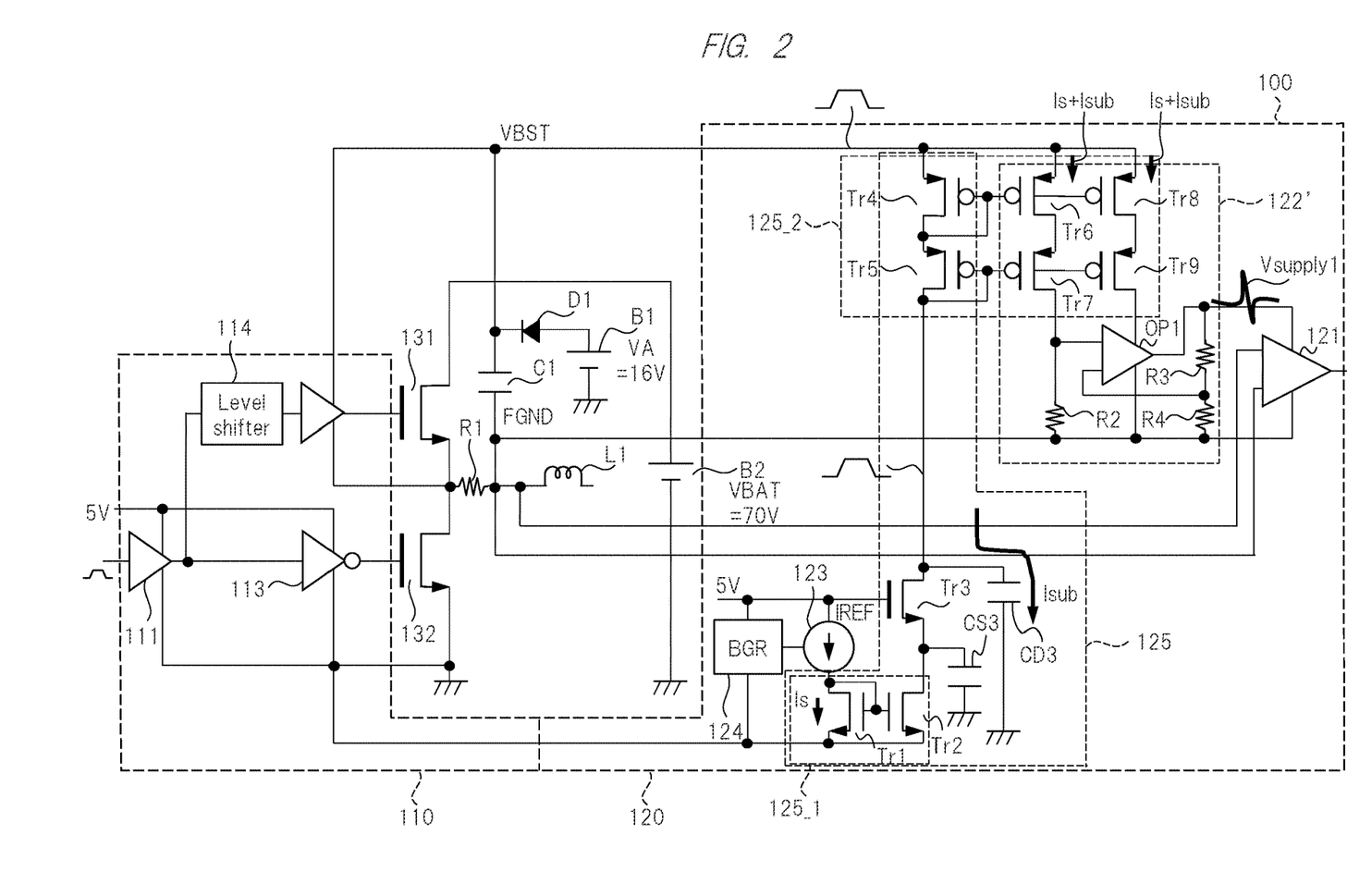
FIG. 2 is a circuit diagram for explaining a part of one example of the semiconductor device according to the first embodiment.

FIG. 2 is a circuit diagram showing a detailed circuit of a configuration in which the LDO circuit unit 122 is not provided with an error absorption circuit unit in the semiconductor device according to the present embodiment. FIG. 2 omits a low-voltage region across the insulating layer IL of FIG. 1. In FIG. 2, the IREF circuit unit 123 between the BGR circuit unit 124 and the LDO circuit unit 122, and the level shift circuit unit 125 including transistors Tr3, Tr4, Tr5 are present. Incidentally, the GDU 110 has been described in detail in FIG. 1, so that a overlapping description thereof will be omitted. Also, the motor M1 is simplified and is shown by using an inductance L1 for one phase. Further, a circuit diagram is shown with a power supply voltage of 5 V applied, as a low voltage, to the power supplies of the BGR circuit unit 124 and the REF circuit unit 123.

By using a constant voltage outputted from the BGR circuit unit 124, the IREF circuit unit 123 outputs a current Is that is a constant current. Since the principle of generating the constant current in the IREF circuit unit 123 is a well-known technique, a detailed description thereof will be omitted. The current Is flows through a first current mirror circuit unit 125_1 configured by the transistor Tr1, whose gate and drain are short-circuited, and the transistor TR2. Therefore, the current Is also flows through the transistor TR2 as a mirror current. That is, the current Is also flows through the transistors Tr3, Tr4, and Tr5. Incidentally, the present embodiment meets the following relationship: a withstand voltage of the transistor Tr3>>a withstand voltage of the transistor Tr4>a withstand voltage of the transistor Tr5. As one example, the withstand voltage of the transistor Tr3 is preferably equal to or higher than a voltage of the battery B2, and the withstand voltage of the transistor Tr5 is preferably equal to or higher than a voltage of the battery B1. If the transistor Tr3 has a high withstand voltage and a gate voltage of the transistor Tr3 is a low voltage, a voltage of a source of the transistor Tr3 is (low voltage (5 V)−gate threshold voltage), so that the transistor Tr3 functions as a clamp transistor. Therefore, the BGR circuit unit 124 and the REF circuit unit 123 can be designed in a low voltage region. Incidentally, forming a cascode current mirror circuit with the transistors Tr4, Tr5 makes it possible to improve accuracy of a copy current flowing through the LDO circuit unit 122. As one example, the withstand voltage of the transistor Tr3 is 100 V and the withstand voltage of the transistor Tr5 is 100 V, but the withstand voltages of the transistor Tr3 and the transistor Tr5 are not limited to these voltages.

However, since a parasitic capacitance CD3 on a drain side of the high withstand-voltage transistor Tr3 also increases, a value of a current Isub flowing through the parasitic capacitance CD3 also increases. When the current Isub increases, the current Isub is applied to the current Is and flows, so that the following cases occurs: a fluctuation in level-shifted output voltage of the LDO circuit unit 122 becomes great; an output of the amplifier 121 is not stable; and the controller 220 cannot accurately detect a drive current of the motor. Therefore, in the present embodiment, a dummy transistor that is a copy of the transistor Tr3 is provided in the LDO circuit unit 122 so that the current Isub applied to and flowing with the current Is flows through the parasitic capacitance of the dummy transistor. The dummy transistor will be detailed in a description of FIG. 3 mentioned below. Incidentally, the dummy transistor is one example of the error absorption circuit unit described above. For example, a capacitor whose capacitance value is the parasitic capacitance of the dummy transistor can also be an example of the error absorption circuit unit. In addition, a parasitic capacitance CS3 is also formed in the transistor Tr3, but since a source voltage of the transistor Tr3 is a low voltage, magnitude of a current flowing through the parasitic capacitance CS3, which has a capacitance value close to that of the parasitic capacitance CD3, is less than that of a current flowing through the parasitic capacitance CD3. Therefore, in the following description, the current Isub will be mainly described.

Also, a second current mirror circuit unit 125_1 uses the transistors Tr4, Tr5 as input stages, and has two output stages for the input stages. A first output stage of the second current mirror circuit unit 125_1 includes transistors Tr6, Tr7, a second output stage includes transistors Tr8, Tr9, and (current Is+current Isub) flows through each output stage as a mirror current.

Further, the current Isub, which is a fluctuating current to become an error, is applied to the mirror current Is of the first current mirror circuit unit 125_1, and the fluctuating current flows through the LDO circuit unit 122, so that the power supply voltage applied to the amplifier 121 leads to fluctuation like Vsupply1. It the power supply voltage applied to the amplifier 121 fluctuates, the output of the amplifier 121 also fluctuates, so that the error absorption circuit unit that absorbs the current Isub is required.

Figure 3:
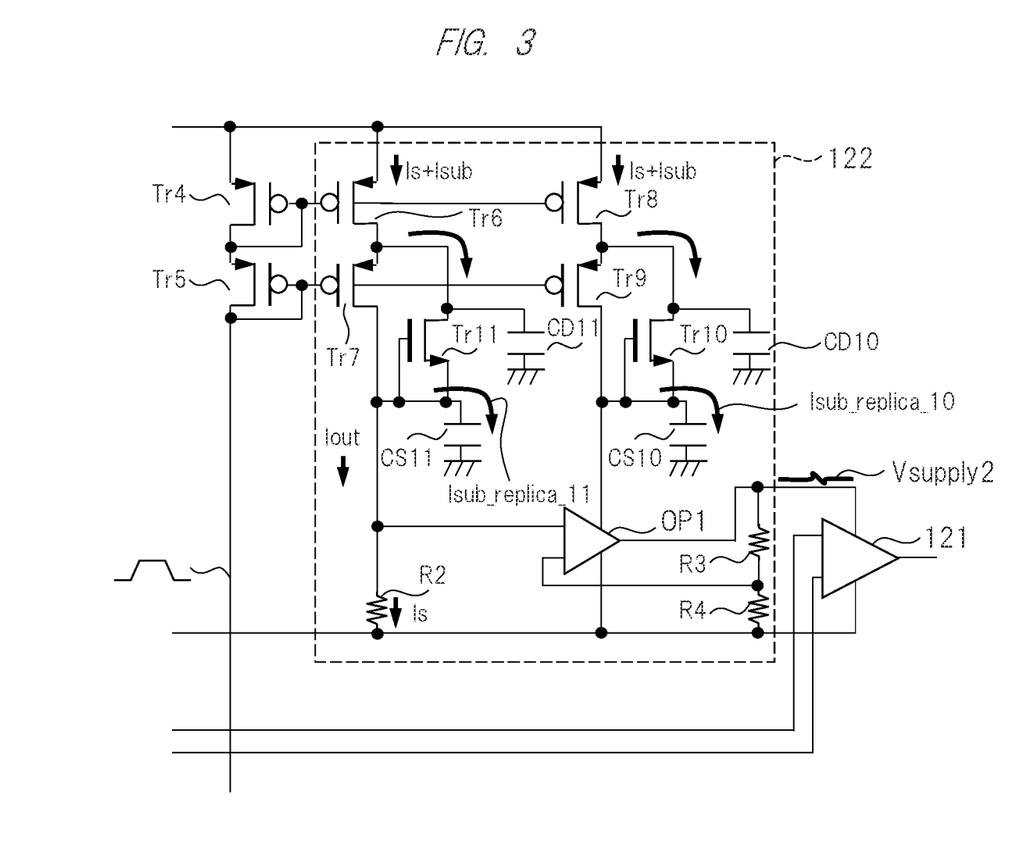
FIG. 3 is a circuit diagram including a configuration not shown in FIG. 2 in the semiconductor device according to the first embodiment.

FIG. 3 is a circuit diagram in which dummy transistors Tr10, Tr11 to be copies of the transistor Tr3 are provided, as an error absorption circuit unit, in the LDO circuit unit 122. The current Is+current Isub flowing through the transistors Tr4, Tr5 flow through the transistors Tr6, Tr7 forming the output stage of the second current mirror circuit unit. Similarly, the current Is+current Isub flowing through the transistors Tr4, Tr5 flow through the transistors Tr8, Tr9 forming the output stage of the second current mirror circuit unit. A power supply voltage of an operational amplifier OP1 is supplied by the currents flowing through the transistors Tr8, Tr9. Therefore, as described above, when the currents flowing through the transistors Tr8, Tr9 fluctuate, the power supply voltage of the operational amplifier OP1 also fluctuates and the output voltage of the operational amplifier OP1 is affected (for example, fluctuated like Vsupply1 in FIG. 2). Also, a reference voltage of the operational amplifier OP1 is formed by the currents flowing through the transistors Tr6, Tr7. Therefore, when the currents flowing through the transistors Tr6, Tr7 fluctuate, the reference voltage fluctuates and the output voltage of the operational amplifier OP1 is affected (for example, fluctuated like Vsupply1 in FIG. 2).

Thus, a dummy transistor Tr10 is provided as an error absorption circuit unit for absorbing the current Isub. Parasitic capacitances CD10, CS10 are formed at the dummy transistor Tr10. Then, a drain of the dummy transistor Tr10 is electrically connected to a source of the transistor Tr9 and a drain of the transistor Tr8, and gate and source of the dummy transistor Tr10 are electrically connected to a drain of the transistor Tr9. By doing so, most of the current Isub is absorbed by the parasitic capacitance CS10 as a current Isub replica.

Similarly, a dummy transistor Tr11 is provided as an error absorption circuit unit for absorbing the current Isub. Parasitic capacitances CD11, CS11 are formed at the dummy transistor Tr11. Thus, a drain of the dummy transistor Tr11 is electrically connected to the source of the transistor Tr7 and the drain of the transistor Tr6, and gate and source of the dummy transistor Tr11 are electrically connected to the drain of the transistor Tr7. By doing so, most of the current Isub is absorbed by the parasitic capacitance CS11 as a current Isub_replica.

Due to the parasitic capacitance CS10 and the parasitic capacitance CS11, the output voltage of the LDO circuit unit 122 becomes a voltage less in fluctuation than the voltage Vsupply1 like the voltage Vsupply2.

Figure 4:
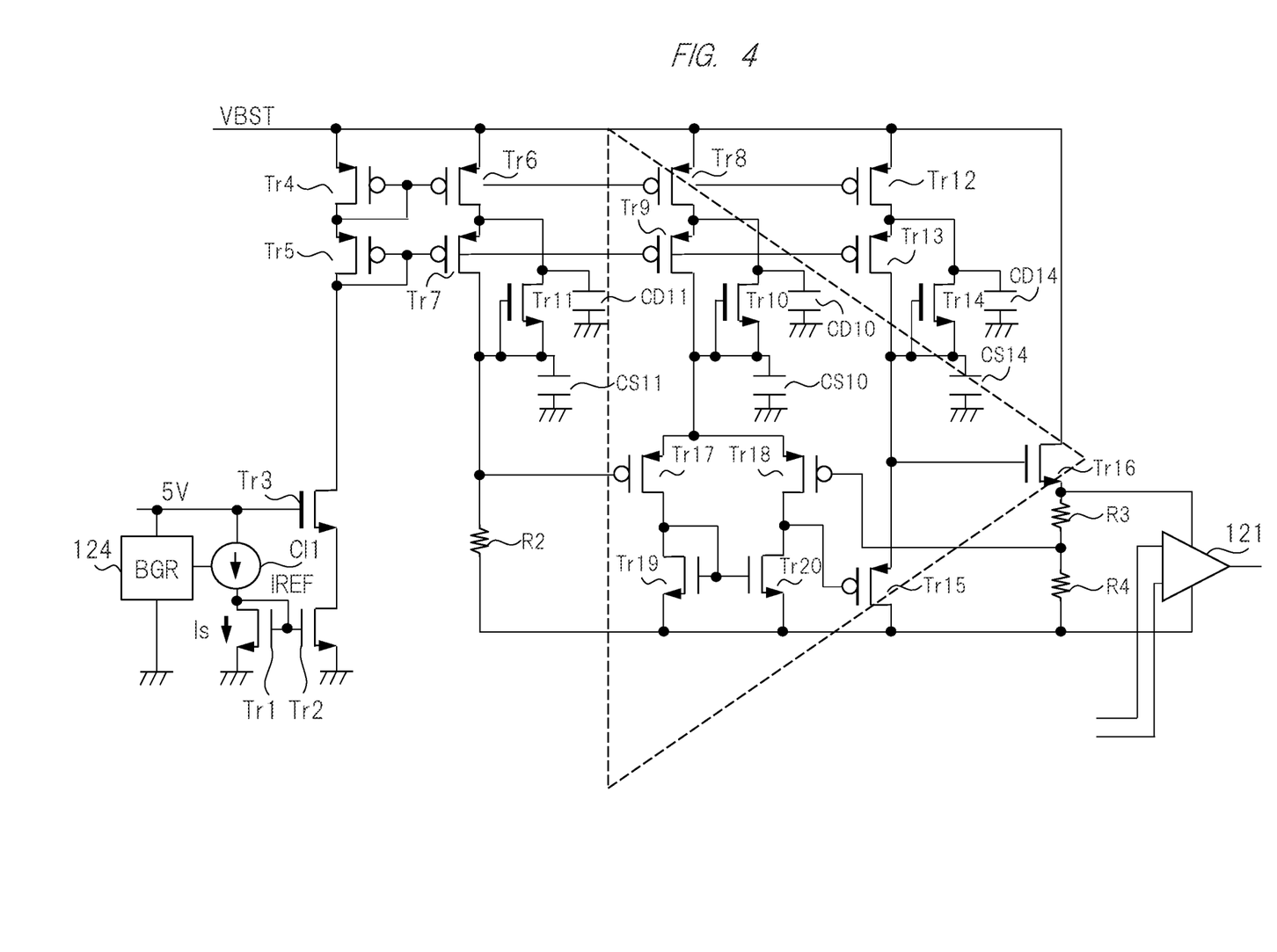
FIG. 4 is a circuit diagram showing the semiconductor device according to the first embodiment on a transistor basis.

FIG. 4 is a circuit diagram schematically showing an inside of the operational amplifier OP1 in FIG. 3. The operational amplifier OP1 includes transistors Tr17, Tr18, Tr19, Tr20 forming a differential input stage, a transistor Tr15 forming a gain stage, a transistor Tr16 forming an output stage, transistors Tr12, Tr13 supplying a constant current, and a dummy transistor Tr14. The current Isub is absorbed by parasitic capacitances CD14, CS14 formed at the dummy transistor Tr14. Incidentally, most of the current Isub is absorbed by the parasitic capacitance CS14 as a current Isub_replica.

According to the first embodiment, provided on the high voltage side can be the semiconductor device in which the required circuit functions are combined and are made one chip and the level shift behavior having a high power-supply rejection ratio from a low voltage to a high voltage is possible by the level shift circuit and the error absorption circuit.

(First Experiment)

Figure 5:
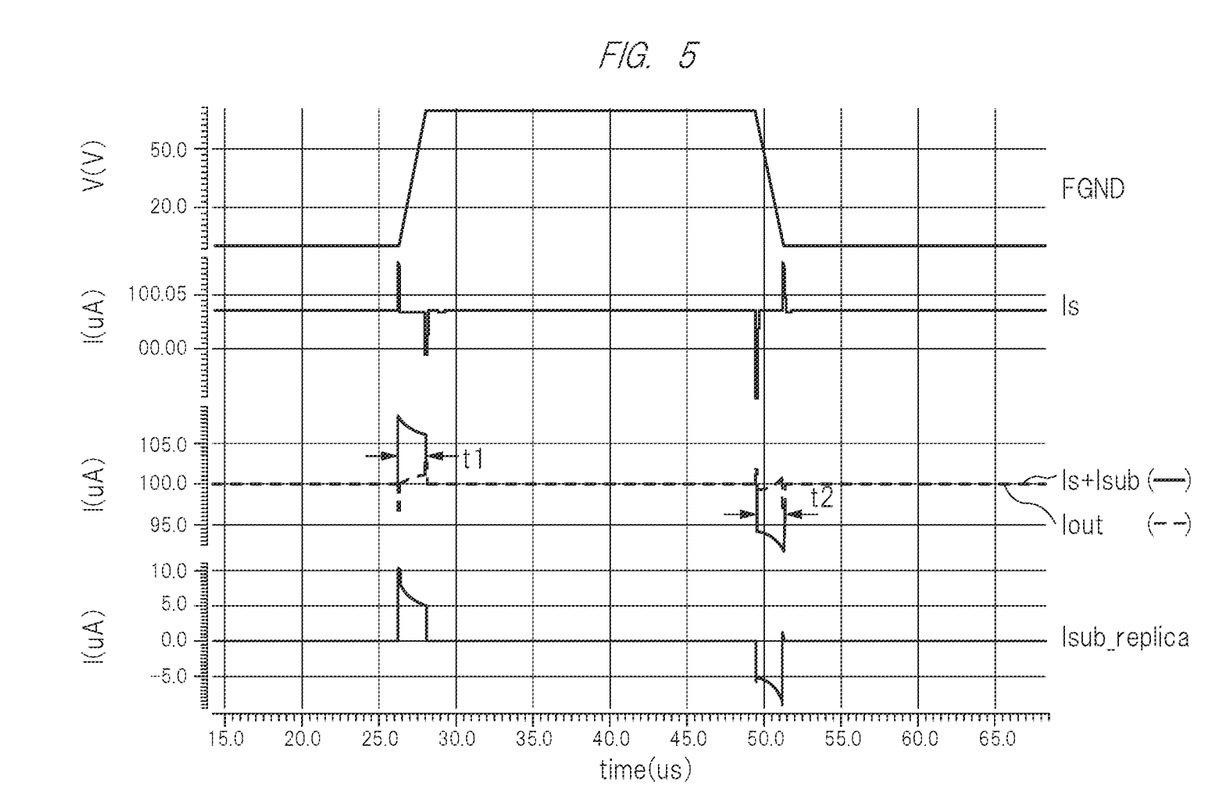
FIG. 5 is an example of an experimental result of the semiconductor device according to the first embodiment.

FIG. 5 shows a result of measuring a current flowing through each unit where the dummy transistor is not formed and where the dummy transistor is formed in the semiconductor device configured by the present embodiment. In FIG. 5, shown is a pulse waveform in which the floating ground FGND is switched between 0 V and the bootstrap voltage. At rising of the pulse waveform of the floating ground FGND, the current Is generates positive and negative spike-like currents due to a floating inductance component of the circuit. Also at falling of the pulse waveform of the floating ground FGND, the current Is generates positive and negative spike-like currents due to the floating inductance component of the circuit.

The current (Is+Isub: solid line) has a waveform obtained by adding a pulse-like current Isub for charging and discharging the parasitic capacitance CD3 in addition to the above current Is. The current Isub occurs during about 1.750 μs (values of t1 and t2) and has a current value of about 8.4 μA. Further, it is confirmed that the current Isub_replica having a current value equivalent to that of the current Isub flows through the parasitic capacitance of the dummy transistor during a period equivalent to that of the current Isub. As a result of the current Isub_replica flowing, as shown by a current Iout (broken line), a fluctuation interval is shortened to about 0.005 μs, and a fluctuating current value is reduced to about 3.5 μA. Incidentally, the current Iout is a current that flows through the resistor R2 to generate the reference voltage in FIG. 3.

(Second Experiment)

Figure 6:
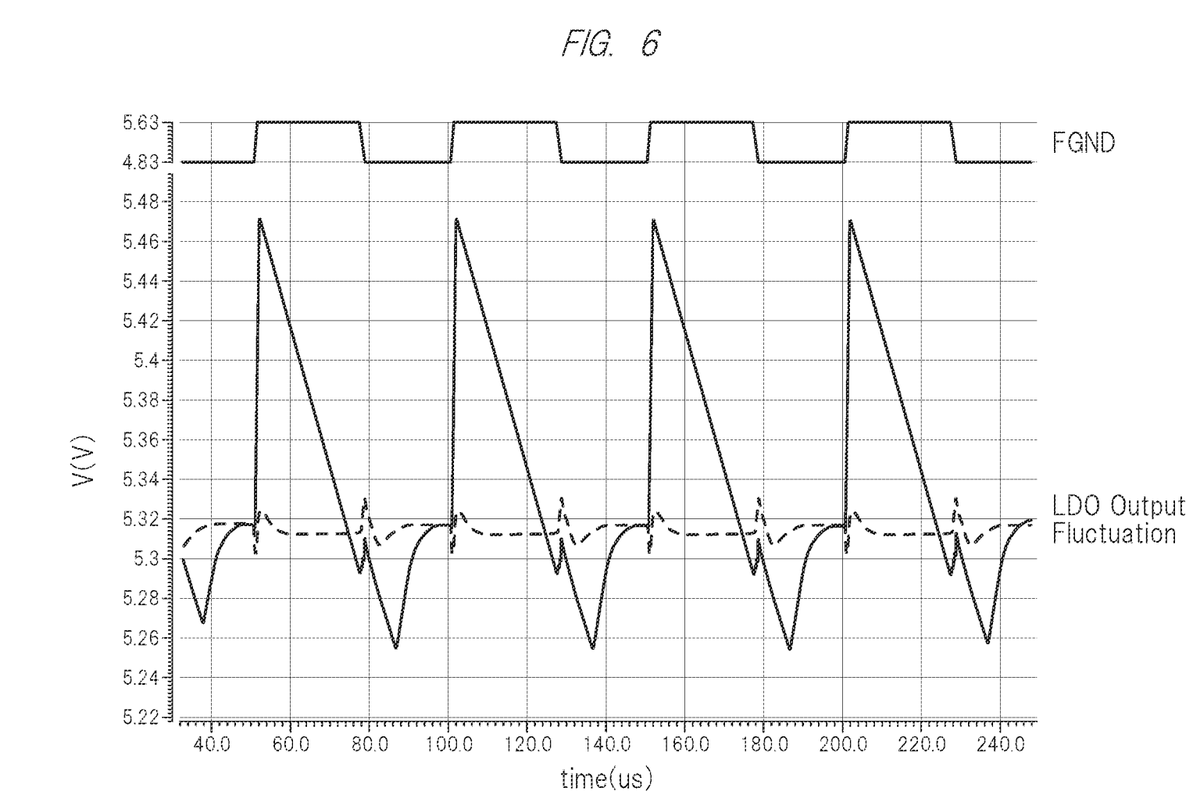
FIG. 6 is an example of an experimental result of the semiconductor device according to the first embodiment.

FIG. 6 shows a result of measuring, as a voltage, a current flowing through each unit where the dummy transistor is not formed and where the dummy transistor is formed in the semiconductor device configured by the present embodiment. Similar to FIG. 5, a pulse waveform in which the floating ground FGND is switched between 0 V and the bootstrap voltage is shown in an upper portion of FIG. 6. An LDO output fluctuation indicates a fluctuation of an output voltage of the LDO circuit unit 122. The LDO output fluctuation when no dummy transistor is formed indicates a peak value of about 152 mV. However, the LDO output fluctuation when the dummy transistor is formed indicates a peak value of about 17 mV. That is, if a full scale of the output voltage of the amplifier 121 is 1 V and the PSRR is −20 dB, the output fluctuation when the dummy transistor is not formed becomes about 1.5%, and the output fluctuation when the dummy transistor is formed becomes about 0.17%. Since the output fluctuation in the specification of the amplifier 121 is less than 0.3%, forming the dummy transistor makes it possible to satisfy the specification of the output fluctuation of the amplifier 121.

As described above, according to the first embodiment, provided on the high voltage side can be the semiconductor device in which the required circuit functions are combined into a single chip and the level shift behavior having the high power-supply rejection ratio from the low voltage to the high voltage is possible by providing the level shift circuit unit and the error absorption circuit unit.

Second Embodiment

Figure 7:
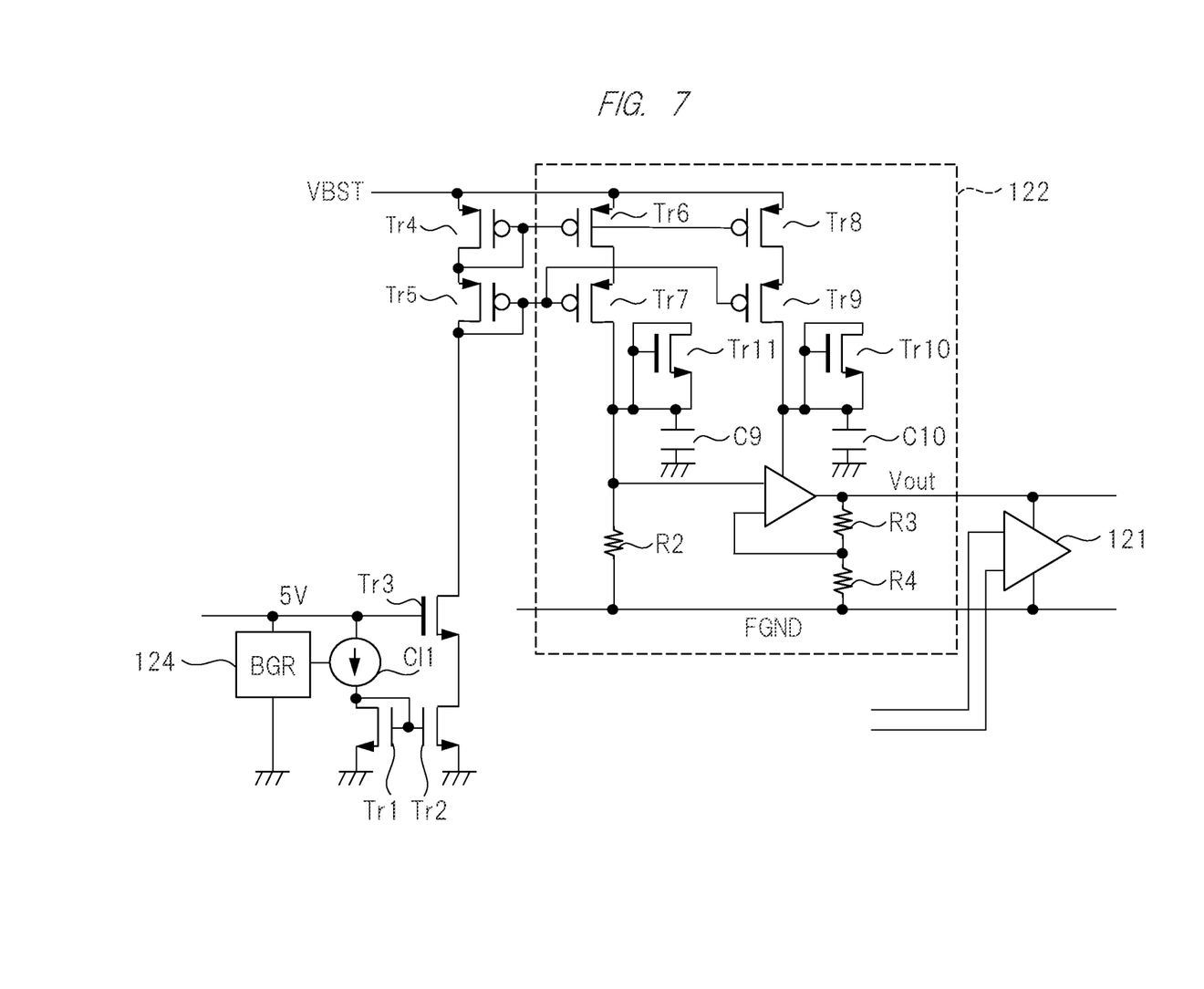
FIG. 7 is a circuit diagram showing one example of a semiconductor device according to a second embodiment.

In the first embodiment, the dummy transistor is electrically connected in parallel to the transistor forming the output stage of the second current mirror circuit unit. That is, the drain and source of the dummy transistor are connected in parallel to the source and drain of the transistor forming the output stage of the second current mirror circuit unit. However, in a second embodiment, shown in FIG. 7 is a configuration in which three terminals of the drain, gate, and source of the dummy transistor are connected to one another and are connected to an output terminal (drain or source) of the transistor forming the output stage of the second current mirror circuit unit. By connecting the three terminals of the drain, gate, and source of the dummy transistor to one another, a parasitic capacitance on a drain side of the dummy transistor and a parasitic capacitance on a source side of the dummy transistor are added, so that an area of the dummy transistor can be reduced. For example, even if a formation area of the dummy transistor of the second embodiment is half a formation area of the dummy transistor of the first embodiment, the same output fluctuation as that of the first embodiment can be realized.

FIG. 7 shows a configuration in which the three terminals of the drain, gate, and source of the dummy transistor Tr10 to become the error absorption circuit unit are connected to one another and the connected terminals are connected to the drain to become an output terminal of the transistor Tr9 forming the output stage of the second current mirror circuit unit. Further, FIG. 7 shows a configuration in which a configuration the three terminals of the drain, gate, and source of the dummy transistor Tr11 are connected to one another and the connected terminals are connected to the drain to become the output terminal of the transistor Tr9 forming the output stage of the second current mirror circuit unit. A capacitor C9 has a capacitance obtained by adding a parasitic capacitance CS11 on the source side and a parasitic capacitance CD11 on the drain side of the dummy transistor Tr11. Furthermore, a capacitor C10 has a capacitance obtained by adding a parasitic capacitance CS10 on the source side and a parasitic capacitance CD10 on the drain side of the dummy transistor Tr10.

According to the configuration of the second embodiment, the parasitic capacitance on the drain side of the dummy transistor to become the error absorption circuit unit and the parasitic capacitance on the source side of the dummy transistor are added. Therefore, the area of the dummy transistor can be reduced. For example, even if the formation area of the dummy transistor of the second embodiment is half the formation area of the dummy transistor of the first embodiment, the same output fluctuation as that of the first embodiment can be realized.

Third Embodiment

Figure 8:
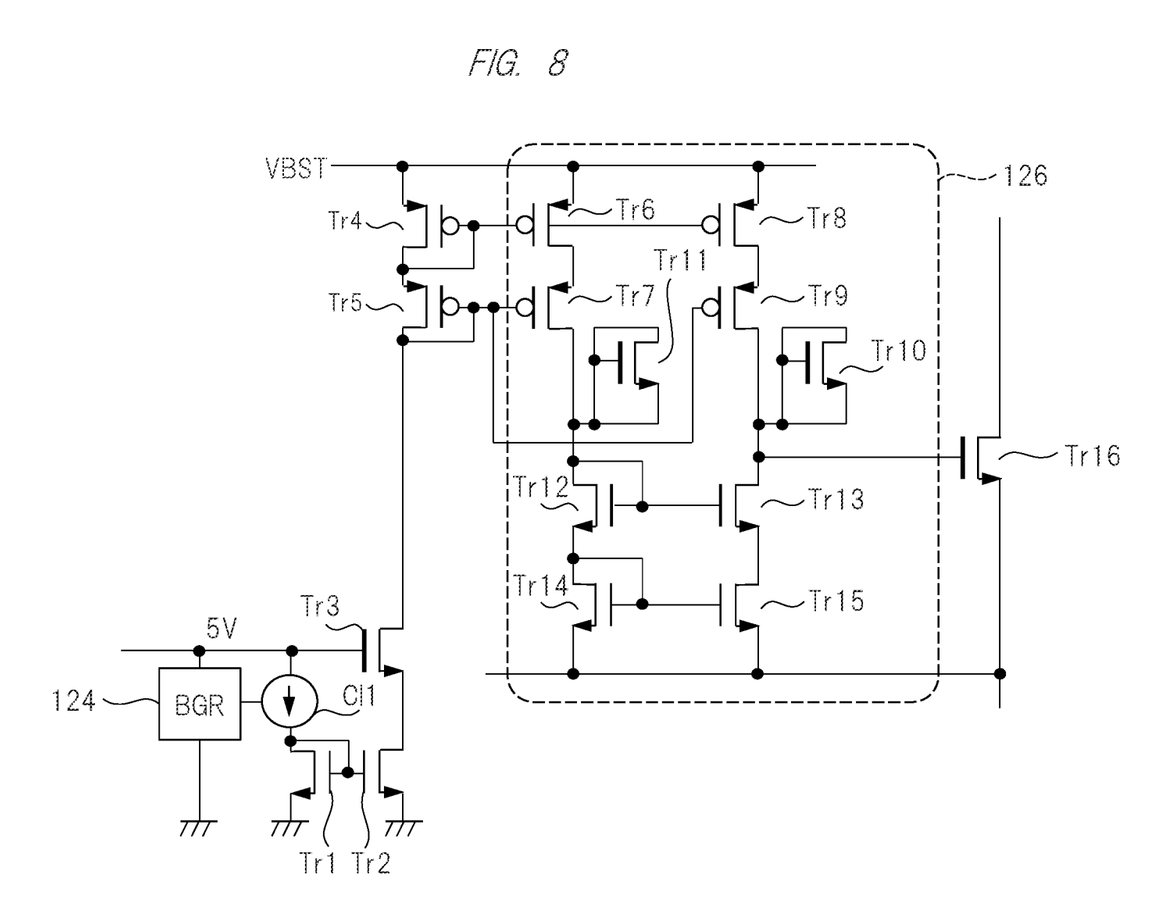
FIG. 8 is a circuit diagram showing one example of a semiconductor device according to a third embodiment.

A third embodiment is an embodiment in which the LDO circuit unit 122 of first and second embodiments is applied to a pre-driver circuit unit 126 for current control. Since a fluctuation range of an output current of an output stage of a current mirror circuit in a pre-driver circuit unit 126 is sufficiently small, a fluctuation in current flowing into a gate of a drive transistor Tr16 becomes small and a slew rate of the drive transistor Tr16 can be improved.

Fourth Embodiment

Figure 9:
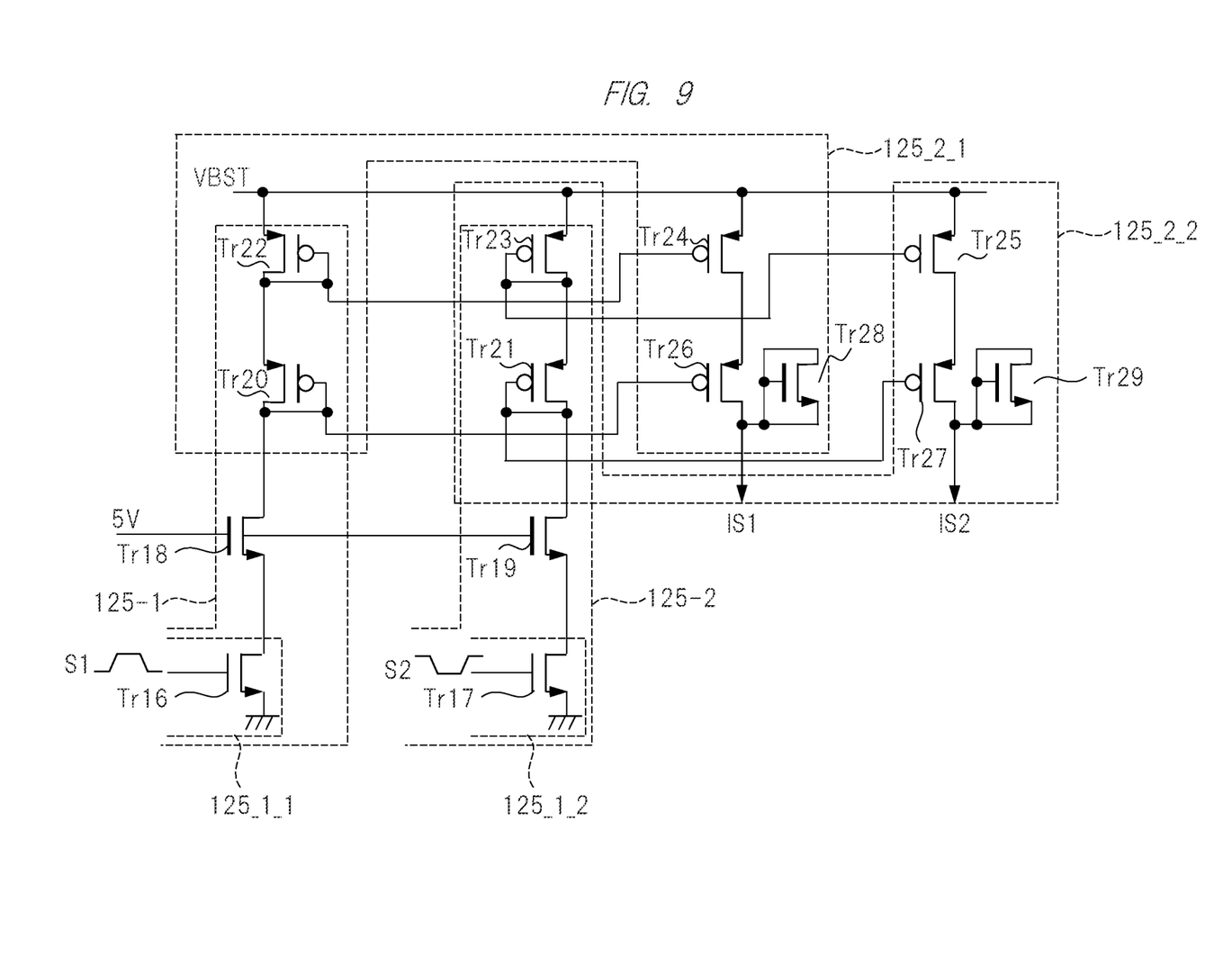
FIG. 9 is a circuit diagram showing one example of a semiconductor device according to a fourth embodiment.

A fourth embodiment is shown in FIG. 9. A fourth embodiment shows a configuration in which a first current mirror circuit unit 125_1 includes first sub current mirror circuit units 125_1_1, 125_1_2 and a second current mirror circuit unit 125_2 includes second sub current mirror circuit units 125_2_1, 125_2_2. Incidentally, in FIG. 9, the first sub current mirror circuit unit 125_1_1 shows only the transistor Tr16 in the output stage and the first sub current mirror circuit unit 125_1_2 shows only the transistor Tr17 in the output stage.

Also, a level shift circuit unit 125-1 includes a transistor Tr18, which is a clamp transistor electrically connected in series to the transistor Tr16 in the output stage of the first sub current mirror circuit unit 125_1_1. Similarly, a level shift circuit unit 125-2 includes a transistor Tr19, which is a clamp transistor electrically connected in series to the transistor Tr17 in the output stage of the first sub current mirror circuit unit 125_1_2.

Further, the level shift circuit unit 125-1 is electrically connected in series to the transistor Tr18 which is a clamp transistor, and includes a transistor Tr20 and a transistor Tr22 through which a first sub mirror current serving as a mirror current of the first sub current mirror circuit unit 125_1_1 flows. The transistor Tr20 and the transistor Tr22 form an input stage of a second sub current mirror circuit unit 125_2_1. Also, the level shift circuit unit 125-2 is electrically connected in series to the transistor Tr19, which is a clamp transistor, and includes a transistor Tr21 and a transistor Tr23 through which the first sub mirror current serving as the mirror current of the first sub current mirror circuit unit 125_1_2 flows. The transistor Tr21 and the transistor Tr23 form an input stage of a second sub current mirror circuit unit 125_2_2.

The output stage of the second sub current mirror circuit unit 125_2_1 is formed by series-connected transistors Tr24 and Tr26. At an output terminal (drain in FIG. 9) of the transistor Tr26 that supplies the second sub current serving as the mirror current of the second sub current mirror circuit unit 125_2_1 to the next stage, a transistor Tr28 that is a dummy transistor as an error absorption circuit unit is formed. The transistor Tr28 is a dummy transistor having the same structure as the transistor Tr18, which is a clamp transistor.

The output stage of the second sub current mirror circuit unit 125_2_2 is formed by series-connected transistors Tr25 and Tr27. At an output terminal (drain in FIG. 9) of the transistor Tr27 that supplies the second sub current serving as the mirror current of the second sub current mirror circuit unit 125_2_2 to the next stage, a transistor Tr29 that is a dummy transistor as an error absorption circuit unit is formed. The transistor Tr29 is a dummy transistor having the same structure as the transistor Tr19, which is a clamp transistor.

According to the fourth embodiment, the level shift circuit unit and the error absorption circuit unit of the present disclosure can be applied to a two-stage cascode current mirror circuit.

In the foregoing, the invention made by the inventor of the present invention has been concretely described based on the embodiments. However, it is needless to say that the present invention is not limited to the foregoing embodiments and various modifications and alterations can be made within the scope of the present invention. For examples, the embodiments above have been described in detail so as to make the present invention easily understood, and the present invention is not always limited to the embodiment having all of the described constituent elements. Furthermore, another configuration may be added to a part of the configuration of each embodiment, and a part of the configuration of each embodiment may be eliminated or replaced with another configuration.

What is claimed is:

1. A semiconductor device comprising:
    a constant current generating circuit unit;
    a first current mirror circuit unit having as an input current a constant current outputted by the constant current generating circuit unit, and generating a first mirror current as a mirror current;
    a level shift current unit including a clamp transistor between whose drain and source the first mirror current flows and to whose base a power supply voltage of the constant current generating circuit unit is applied, and a transistor that is connected in series to the clamp transistor and through which the first mirror current flows;
    a second current mirror circuit unit having as an input stage the transistor and having as an output stage a transistor through which a second mirror current obtained by replicating the first mirror current flows; and an error absorption circuit unit having a capacitance corresponding to a parasitic capacitance of the clamp transistor connected to a terminal for outputting the second mirror current of the output-stage transistor in the second current mirror circuit unit.

2. The semiconductor device according to claim 1, wherein the input-stage transistor and the output-stage transistor in the second current mirror circuit unit are configured by electrically connecting a plurality of transistors having different withstand voltages in series, and wherein a plurality of transistors in the input-stage transistor and a plurality of transistors in the output-stage transistor are configured so that a plurality of transistors having the same electrical characteristics oppose one another.

3. The semiconductor device according to claim 1, wherein the error absorption circuit unit is a parasitic capacitance of a dummy transistor replicating the clamp transistor, and forms as error absorption circuit unit the dummy transistor whose gate and source are short-circuited.

4. The semiconductor device according to claim 3, wherein the dummy transistor is electrically connected in parallel to a terminal for inputting the second mirror current and a terminal for outputting the second mirror current of the output-stage transistor.

5. The semiconductor device according to claim 3, wherein the dummy transistor is short-circuited between its drain and source.

6. The semiconductor device according to claim 1, wherein an output stage of the second current mirror circuit unit includes a plurality of transistors, a plurality of output-stage transistors are electrically connected in parallel to one another, and the error absorption circuit unit is connected to a terminal for outputting the second mirror current of each of the plurality of output-stage transistors.

7. The semiconductor device according to claim 1, wherein the first current mirror circuit unit includes a plurality of first sub current mirror circuit units, wherein the level shift current unit includes a plurality of clamp transistors electrically connected in series to respective transistors forming output stages of the plurality of first sub current mirror circuit unit, and includes a plurality of transistors that are electrically connected in series to the clamp transistors and through which a first sub mirror current serving as a mirror current of the first sub mirror circuit unit flows, wherein the second current mirror circuit unit includes a plurality of second sub current mirror circuit units having as input stages the transistors through which a first sub mirror current serving as a mirror current of the first sub current mirror circuit unit flows, and wherein the error absorption circuit unit is provided at each output stage of a transistor for outputting a second sub mirror current serving as a mirror current of the second sub current mirror circuit unit.

* * * * *